United States Patent [19]

Moehlenpah

[11] 4,209,265
[45] Jun. 24, 1980

[54] CONNECTOR SYSTEM FOR WOOD STRUCTURES

[76] Inventor: Walter G. Moehlenpah, 9906 Old Wardon Rd., St. Louis, Mo. 63124

[21] Appl. No.: 925,480

[22] Filed: Jul. 17, 1978

[51] Int. Cl.² .......................... F16B 1/00; F16B 15/00
[52] U.S. Cl. ........................................ 403/230; 85/13; 403/405
[58] Field of Search .............. 85/13, 11; 52/693, 694, 52/696, 634; 113/116 V, 116 BB; 248/300; 403/230, 231, 232.1, 405, 403, 205

[56] References Cited

U.S. PATENT DOCUMENTS

| | | | |
|---|---|---|---|
| 933,067 | 9/1909 | Ferry | 403/205 |
| 1,914,728 | 6/1933 | Plym | 113/116 V X |
| 2,117,308 | 5/1938 | Frey | 85/13 |
| 2,460,353 | 2/1949 | Killingsworth | 113/116 V X |
| 3,841,194 | 10/1974 | Moehlenpah | 85/13 |

Primary Examiner—Ramon S. Britts
Attorney, Agent, or Firm—Senniger, Powers, Leavitt and Roedel

[57] ABSTRACT

A connector system for rigidly securing two intersecting wood members of a wood structure together in abutting relation. The connector system includes at least one pair of substantially congruent, L-shaped members of commercial sheet steel or the like. Each of the connectors has two legs with teeth struck therefrom and extending generally perpendicular to the plane of the connector. The pair of connectors is driven into the wood members on opposite sides thereof at an intersection of the wood members with the one leg of each of the connectors extending in opposite directions along one of the wood members and with the other of the legs of the connectors facing one another on opposite sides of the other wood member. All of the teeth in the legs of each connector are embedded in the wood members.

13 Claims, 5 Drawing Figures

CONNECTOR SYSTEM FOR WOOD STRUCTURES

BACKGROUND OF THE INVENTION

This invention relates to a system for connecting two intersecting wood members together in abutting relation, and more particularly relates to connectors, often referred to as nailing plates, made from sheet metal having a plurality of integral teeth struck therefrom for securing together two intersecting wood members of a wood structure.

Heretofore, the 2×4 studs of factory-made wall panel assemblies were secured to the 2×4 top and bottom plate members of the wall panel by means of nails driven through the plate members and endwise into the ends of the studs. While this nail connection between the studs and the plate members was relatively strong in shear, it was weak in both lateral bending and in tension.

In fabricating factory-made wall panels, rectangular nailing plates, such as shown in U.S. Pat. No. 3,841,194, have been used. These nailing plates were pressed or otherwise driven into the wood members at the intersections or joints of the wall panel by suitable and well-known apparatus. However, certain problems have been encountered. In order for a nailing plate connection to develop full strength, it is necessary that a certain minimum area of the nailing plate with a prescribed number of teeth therein be driven into each of the wood members to be connected together. Due to the arrangment of the 2×4 studs and the plate members of a wall panel structure, nailing plates the width of the stud members (i.e., about 1½ inches) did not have a sufficient working area or number of teeth engaging the plate member to result in a strong joint and wall panels so fabricated were not sufficiently stiff to withstand the stresses of subsequent handling, transportation to building sites, and erection. On the other hand, if rectangular nailing plates were employed which were significantly wider than the studs (e.g., having a width of 3 inches or more) so as to ensure that a sufficient number of teeth engaged or were embedded in the plate member, a substantial portion of the area of these larger rectangular connectors did not engage the stud. Thus a number of teeth were not embedded in the wood members and these exposed teeth constituted a hazard not only to all those who had to handle the wall panel assemblies, but also were hazardous in subsequent construction work, such as during wiring where the insulation of electrical cables could be cut by the sharp tooth edges. Moreover the plate area from which the exposed teeth projected did not significantly increase the strength of the connection and the substantial increased costs of these larger connectors made their use for this purpose uneconomical.

This is an important commercial factor inasmuch as about 60% of the total cost of a nailing plate is the cost of the steel itself so that any significant area of the nailing plate where the teeth remain exposed represents excess and unwarranted cost. For example, to make a sound joint between a 2×4 stud and a 2×4 plate using two rectangular nailing plates, each engaging one exposed 3" length of stud (1½" in width) and a 3" length of plate (1½" wide) would require two 4½"×3" plates. Such plates would each have an area of 4½ sq. in. of unembedded teeth or 9 sq. in. of the 27 sq. in. total area of the two opposed plates per joint which would not be effectively functioning. This unutilized one-third of the metal of the plates therefore represents excess cost. Furthermore, these areas of plates in which the teeth will not become embedded in the wood present another problem during the fabrication of the wood structures. Typically, plates are positioned above each junction of clamped abutting wood members by visually and manually aligning one edge thereof with the edge of the stud and another edge with the bottom edge of the wood plate, the rectangular nailing plate simply resting there with the tips of two-thirds of the teeth lightly resting on the wood surfaces. This would leave 4½ sq. in. out of 13½ sq. in. of nailing plate as an unsupported, unsymmetrical mass. As there is considerable vibration and movement involved in press positioning and operation at each joint to be formed, this unsupported mass increases the tendency for the nailing plates to shift and be dislocated from their visually aligned proper positions and this will result in unsatisfactory joints being formed.

Hence, there has been a long-standing need to develop a connector system for wall panels and other wood structures which overcomes the above-mentioned problems.

Reference may be made to U.S. Pat. No. 2,117,308 for a disclosure of a prior art connector in the same general field as the present invention.

SUMMARY OF THE INVENTION

Among the several objects and features of this invention may be noted the provision of a nailing plate connector system which securely fastens intersecting wood members of a wood structure together in abutting relation; the provision of such a connector system which results in joint connections appreciably stronger in shear, tension, and bending than conventional nailed joints; the provision of such a connector system in which the nailing plates have adequate working area engaging both of the intersecting wood members to be secured together so as to obtain a high strength connection in shear, with all areas of the connector plate being in working engagement with the wood members; the provision of a connector system of the type described which avoids the hazards of exposed teeth and results in wall panels that are sufficiently stiff to withstand the stresses of handling, transportation to building sites and erection; the provision of such a connector system in which the nailing plates may be efficiently manufactured by conventional equipment; the provision of such a connector system in which the connectors may be conveniently and accurately positioned for being properly driven into the wood members with conventional fabricating apparatus; the provision of such a connector system which utilizes only one configuration of nailing plate and which is so dimensioned that it is difficult for workmen to improperly position the connectors prior to their being driven into the wood members; and the provision of such a connector system which is economical to manufacture and to use.

Briefly, a connector system of this invention for rigidly securing two intersecting wood members of a wood structure together in abutting relation comprises at least one pair of substantially congruent, L-shaped connectors of commercial sheet steel or the like. Each of the connectors has a first leg and a second leg. Each connector leg has teeth struck therefrom with the teeth extending generally perpendicularly from the connector for being driven into respective wood members. The pair of connectors is driven into the wood members on opposite sides thereof at the intersection of the wood members (i.e., at the joints of the wood structure) with the second legs of the connectors extending in opposite directions on opposite sides of one of the wood members and with the first legs of the connectors facing one another one opposite sides of the other wood members. All of the teeth of the first legs of the connectors are embedded in the other wood member and all of the teeth of the second connector legs are embedded in the first wood member.

Other objects and features of this invention will be in part apparent and in part pointed out hereinafter.

BRIEF DESCRIPTION OF THE DRAWINGS

Corresponding reference numbers indicate corresponding parts throughout the several views of the drawings.

DESCRIPTION OF A PREFERRED EMBODIMENT

Figure 1:
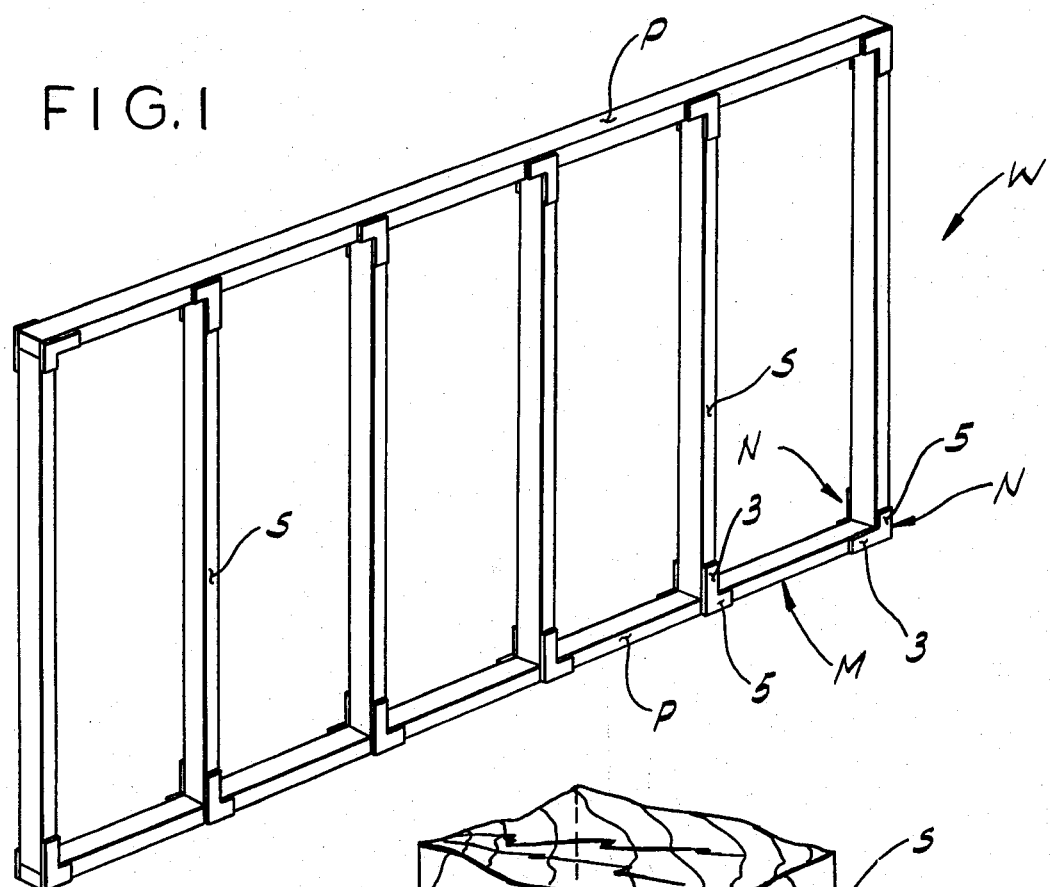
FIG. 1 is a perspective view of the wall panel structure made of 2×4 lumber having top and bottom plate members with vertical studs extending therebetween, the studs being secured to the plate members by connector systems of this invention.

Referring now to the drawings, a wood structure, generally indicated at W, is shown to comprise a plurality of intersecting wood members rigidly secured together by connector systems of this invention, each connector system including a plurality of pairs of connectors or nailing plates N. As shown, wood structure W is a wall panel made of 2×4 lumber having upper and lower plate members P and a plurality of vertical studs S which perpendicularly intersect the plate members and which abut the inwardly facing faces of the plate members. Each of the 2×4 wood members is rectangular in cross-section and has two parallel major (or wide) faces and two parallel minor (or narrow) faces. Plate members P are arranged so that their major faces face upwardly and downwardly and stud members S are so arranged that their minor faces face outwardly of the wall panel when the wall panel is in its erect position. As noted above, the ends of the stud members abut the inwardly facing major faces of the plate members.

Figure 2:
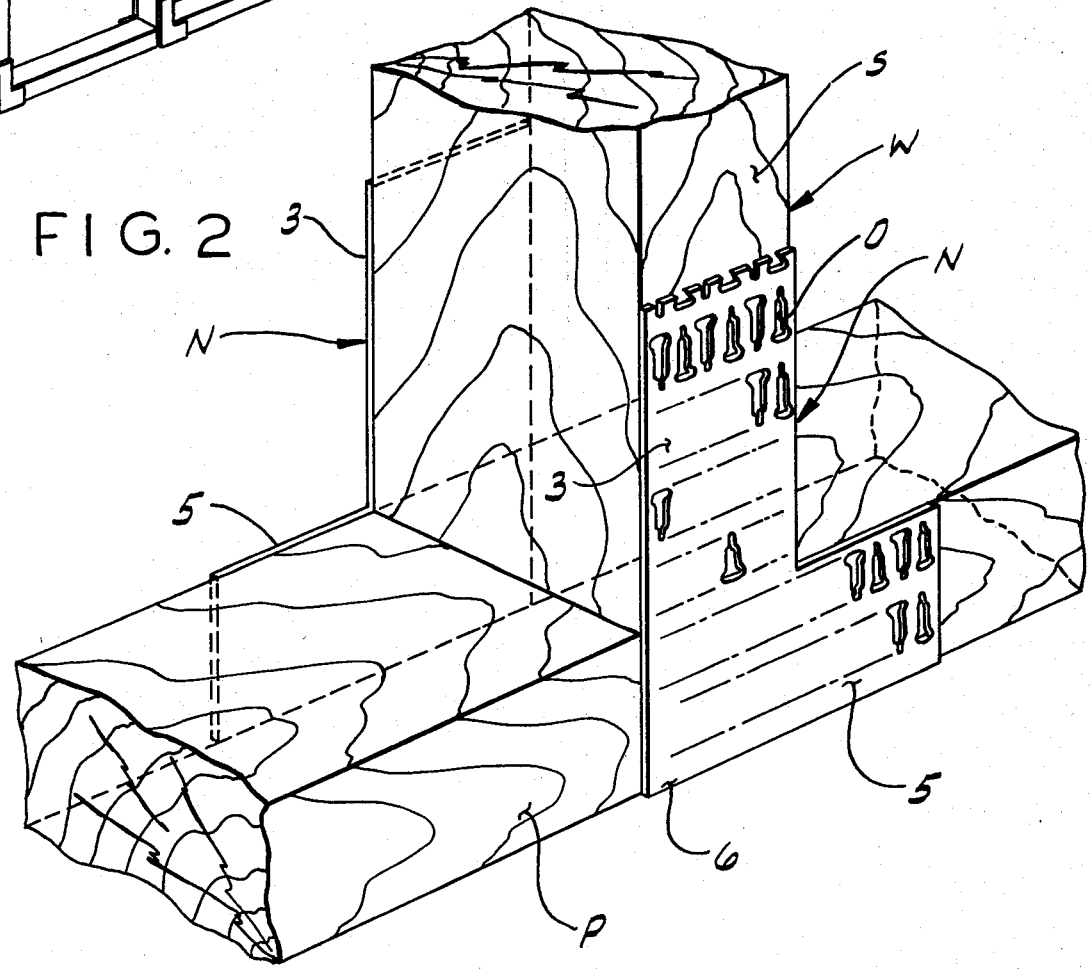
FIG. 2 is an enlarged perspective view of a 2×4 stud member intersecting a 2×4 plate member with the stud and plate members being secured together by a pair of L-shaped connectors constituting the connector system of this invention.
Figure 3:
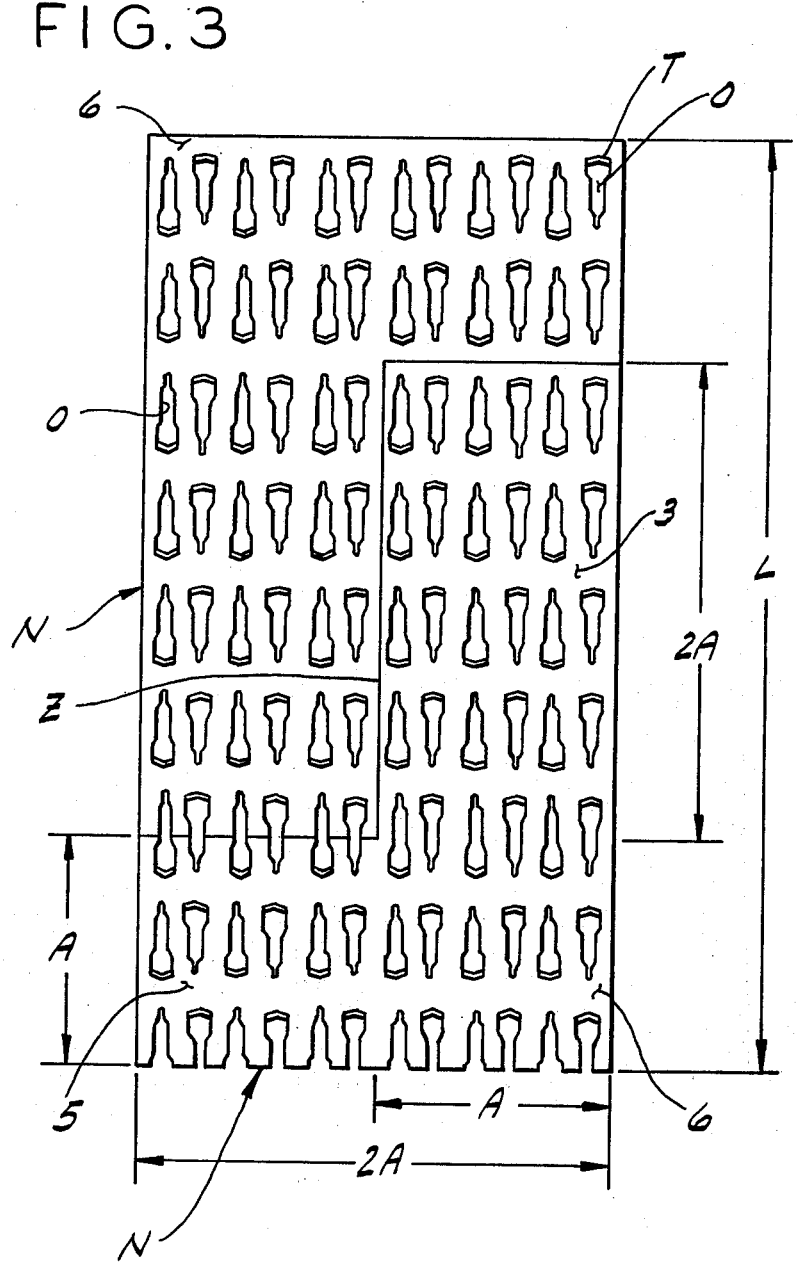
FIG. 3 is a plan view of a segment of a length of a sheet metal strip from which a pair of L-shaped connectors is formed.
Figure 5:
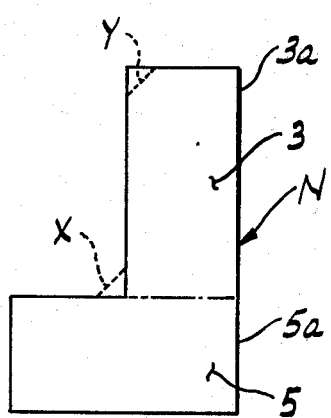
FIG. 5 is a reduced scale plan view of an L-shaped connector illustrating the substantially equal working areas of the first and second legs of the connector.
Figure 4:
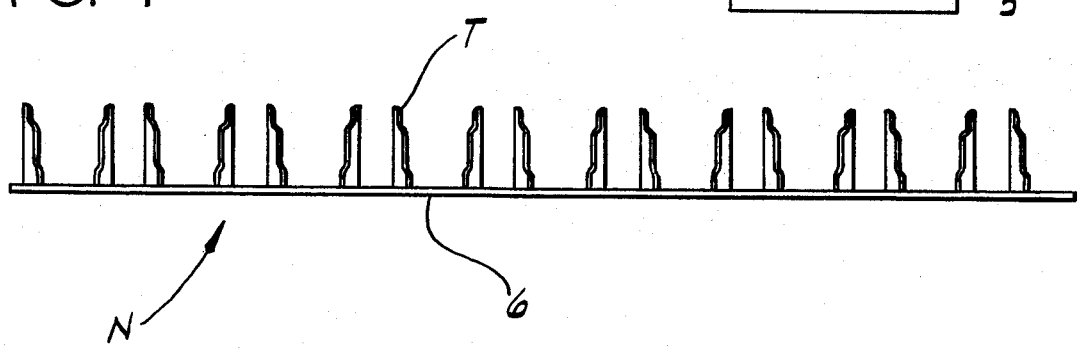
FIG. 4 is a side elevational view of the sheet metal strip shown in FIG. 3.

As shown in FIG. 2, each stud S is secured to its respective upper or lower plate members by pairs of substantially congruent, L-shaped connector plates N. Each of these connector or nailing plates comprises a base plate 6 of sheet metal, preferably galvanized commercial steel or the like, and has a first (or major) leg 3 and a second (or minor) leg 5 (see FIG. 5). Preferably the legs have substantially equal numbers of integral teeth T (see FIGS. 3 and 4) struck from the base plate and a plurality of openings O from which the teeth have been struck. As shown best in FIG. 3, first leg 3 of connector N has about 27 teeth T and second leg 5 has about 24 teeth. It will be understood, however, that the number of teeth in each of the connectors could vary somewhat more than indicated above and the connector would still be within the scope of this invention. It will also be noted that the connector system of this invention may be utilized where the intersecting wood members have different thicknesses, in which case the widths of the legs of the L-shaped connectors would differ and correspond generally to the respective widths of the narrow faces of the intersecting wood members. As shown in FIG. 3, the shape and dimension of teeth T and openings O, the number of teeth per unit area, and the thickness of base plate 6 of nailing plate N are similar to the teeth openings and thickness described in the above-noted U.S. Pat. No. 3,841,194. It will be further understood that shape, size, number of teeth per unit area, and the thickness of the base plate may be varied considerably from those disclosed in the above-noted patent and the connectors constituting a connector system would still be within the scope of this invention. Teeth T are generally perpendicular to base plate 6 and the longitudinal axes of openings O are preferably (but not necessarily) arranged so as to be parallel to the longitudinal axis of first leg 3.

As shown in FIG. 2, a connector system of this invention comprises two connectors or nailing plates N of this invention which are driven or pressed into the minor faces of the intersecting wood members at the intermediate (or interior) intersections or joints of the wood structure W on opposite sides of the wood members with the second legs 5 of the nailing plates of each pair of nailing plates extending in opposite directions on opposite sides of plate member P and with the first legs 3 of each pair of nailing plates facing one another on opposite minor faces of stud member S.

As shown in FIG. 3, the length of the second leg 5 of the connector extends the full width of the connector, as indicated by horizontal dimension 2A. The length of first leg 3 extends at right angles to the second leg from one side of the second leg at one end of the second leg, with one edge of the first leg, as indicated at 3a (see FIG. 5), in continuation of end edge 5a of the second leg. Again as shown in FIG. 3, the length of first leg 3 is preferably substantially equal to the length of the second leg 5, as indicated by vertical dimension 2A. Further, the narrow dimension of each of the legs (i.e., the width of the legs) is preferably substantially equal, as indicated by the dimensions A. It will be understood, however, that the length of the first and second legs could differ substantially and that the widths may also differ appreciably, particularly where wood members of one cross-section dimension are to be joined to those of another.

Further, in accordance with this invention, connectors N are preferably made by dies (not shown) in a punch press which progressively strike a continuous strip of sheet metal incrementally fed into the punch press from a coil. Generally, the width of the strip is a full width of connector N (i.e., the length of second leg 5 as indicated by horizontal dimension 2A). As shown in FIG. 3, two congruent, L-shaped connectors N are formed from a segment of the strip with no resultant waste or scrap material. The segment is shown to have a length L substantially equal to the length of first leg 3 (i.e., 2A) of one of the connectors plus twice the narrow dimension (i.e., A) of the legs of the connectors. Preferably and more specifically, $L = 2A + A + A = 4A$. However, as stated above, the length L may be more or less than 4A. As indicated at Z, the segment is severed along a generally Z-shaped line thereby to simultaneously form the top and inside edges of first legs 3 of the inside edges of second legs 5 of both of the connectors to be formed from the segment. But the line of severance forming the inner corner of each L-shaped connector need not define a 90° angle but may be configured to provide a small 45° gusset portion as shown in dashed line at X (FIG. 5) which also results in one corner of each leg 3a having a complementary shape as indicated at Y. The segment is also severed along a transverse line extending the full width of the connector to simultaneously form the bottom or outside edge of the second leg of connectors in contiguous segments.

As mentioned above, approximately the same number of teeth T are preferably provided in both the first and second legs 3 and 5, respectively, of connector N so that substantially the same number of teeth penetrate plate member P and stud member S when the connector is driven into the plate and stud members at the intersection of the wood members of wood structure W. Thus, each leg of the connector has substantially the same working area and substantially the same holding or fastening capability as the other leg of the connector. It should be recognized that as construction lumber is not homogeneous and has varying grain patterns, knots and other imperfections, not all of the teeth of these L-shaped nailing plates will always be wholly embedded in the wood members. This is particularly true with regard to those teeth on the outer margins of these plates. Because of wood splintering and slight misalignment such teeth are sometimes partially exposed.

As heretofore mentioned, both connectors N of this connector system are substantially congruent. As best shown in FIG. 2, these congruent connectors are driven into opposite minor faces of plate member P and stud members S with the second legs 5 of the connectors being driven into the minor faces of the plate member and extending in opposite directions therealong and with the first legs 3 facing one another on opposite minor faces of the stud member. With the second legs extending in opposite directions along the plate member, the rigidity of the connection between the stud and the plate member is maximized and the assembly has markedly increased stiffness so that it can be handled, transported to the job site and erected. Because the connectors N are essentially congruent (i.e., identical), the inventory of connectors that a wood structure fabricator is required to have on hand is significantly reduced as opposed, for example, to the situation where right- and left-hand connectors would be required for a connector system. Because first leg 3 is preferably intended to be driven into the stud members at all of the intermediate or interior joints of the wood structure in the manner as above-described, workmen may readily position the nailing plates in their proper orientation for being driven into the wood members merely by orienting the connectors so that their first legs 3 are arranged to be driven into opposite minor faces of the stud members. When so oriented, the second legs 5 will of necessity extend in opposite direction along the adjacent plate member and thus the connectors will be properly positioned. However, at the outside or corner joints of wood structure W, it is not possible to orient both connectors so that their second legs extend in opposite directions along the plate member since the plate member terminates there. But, by rotating one of the connectors N of the pair so that its second leg engages the minor face of the stud member and so that its first leg engages the minor face of the plate member, the pair of connectors may be driven into both of the wood members thus making a rigid and secure joint.

It will be further appreciated that with the pair of connectors N driven into the wood members as shown in FIG. 2, not only will the pair of connectors efficiently resist the tension and shear loads between the plate and stud members, but the nailing plates will also effectively resist bending in-the-plane of the connectors. Still further, because the connectors are rigidly secured to the wood members on opposite faces thereof, the connectors also are effective in resisting bending in a direction out-of-the-plane of the connectors because one of the connectors will be placed in tension and the other in compression with the tension member being able to carry relatively high loads. This ensures that the assembled wall panel or the like formed with the connector system of this invention will be sufficiently stiff to withstand the stresses of handling, transportation and erection.

While the connector system of this invention has been illustrated with structures where the wood members abut at a 90° angle, it is also useful where the angle of intersection or abutment differs somewhat from 90°, as in the case of bow-string trusses and similar structures.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A structural joint comprising first and second wood members, the second member having one end engaging one side of the first member and extending generally perpendicularly to the first member, and a pair of substantially congruent, L-shaped connectors of commercial sheet steel or the like, each of said connectors having a first leg and a second leg, said legs each having teeth struck therefrom with the teeth extending generally perpendicularly to the connector for being driven into respective wood members, said pair of connectors being driven into said wood members on opposite sides thereof at the intersection of the wood members with the second leg of each of said connectors extending in opposite directions on opposite sides of said first wood member and with the first legs of said connectors facing one another on opposite sides of said second wood member, all of the teeth of the first legs of said connectors being embedded in said second wood member and all of the teeth of said second connector legs being embedded in said first wood member.

2. A structural joint as set forth in claim 1 in which each of the legs has substantially equal numbers of teeth.

3. A structural joint as set forth in claim 2 in which the areas of said first and said second connector legs are substantially the same.

4. A structural joint as set forth in claim 1 wherein the longitudinal axis of each of said first legs of said connectors is parallel to the longitudinal axis of said second wood member, the longitudinal axis of each of said second legs of said connectors being parallel to the longitudinal axis of said first wood member.

5. A structural joint as set forth in claim 1 wherein a side edge of each of said first legs of said connectors extends along a side edge of said second wood member, a side edge of each of said second legs of said connectors extending along a side edge of said first wood member.

6. A structural joint as set forth in claim 1 wherein said first leg of each of said connectors is substantially as wide as said second wood member and substantially spans the width of said second wood member, said second leg of each of said connectors being substantially as wide as said first wood member and substantially spanning the width of said first wood member.

7. A structural joint as set forth in claim 1 wherein the number of teeth struck per unit area of each of said connectors is uniform over the entire area of each of said connectors.

8. A structural joint as set forth in claim 1 wherein for each of said connectors, said first leg extends at right angles from one side of the second leg at one end of the second leg with one edge of the first leg in continuation of the edge of said one end of said second leg.

9. A structural joint as set forth in claim 8 wherein the areas of said first and second connector legs are substantially the same.

10. A structural joint as set forth in claim 8 wherein said pair of connectors are of such shape that when one of said connectors is positioned relative to the other of said connectors so that said one edge of said first leg of said one connector is aligned with the edge of the other end of the second leg of said other connector, said pair of connectors form a rectangle.

11. A structural joint as set forth in claim 8 wherein the distance from a corner of the first leg along said one edge of the first leg and said one end of the second leg to the corner thereof differs from the distance from said corner of the second leg to a second corner of said second leg along a side edge of said second leg.

12. A structural joint as set forth in claim 1 wherein the length of the first legs of said connectors is substantially the same as the length of the second legs of said connectors.

13. A structural joint comprising first and second wood members, the second member having one end engaging one side of the first member and extending generally perpendicular to the first member, and a pair of substantially congruent L-shaped connectors of commercial sheet steel or the like, each of said connectors having a first leg and a second leg, said legs having substantially equal numbers of teeth struck therefrom with the teeth extending generally perpendicularly to the connector for being driven into respective wood members, the legs of each connector being of substantially equal width, said second leg comprising the area of the connector which extends the full width of the connector, said first leg extending at right angles from one side of the second leg at one end of the second leg, with one edge of the first leg in continuation of the edge of said one end of said second leg, said pair of connectors being driven into said wood members on opposite sides thereof at the intersection of the wood members with the second leg of each of said connectors extending in opposite directions on opposite sides of said first wood members and with the first legs of said connectors facing one another on opposite sides of said second wood member, all of the teeth of the first legs of said connectors being embedded in said second wood member and all of the teeth of said second connector legs being embedded in said first wood member.

* * * * *